(No Model.)
F. A. SWAN.
ELECTRIC CURRENT INDICATOR.
No. 342,475. Patented May 25, 1886.
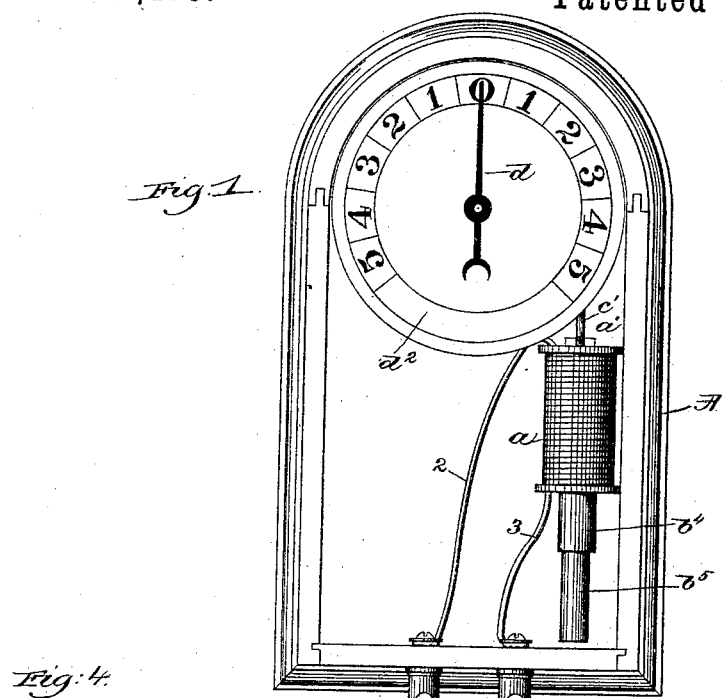
Fig. 1
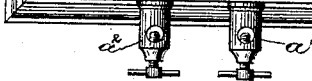
Fig. 4.
Fig. 2.
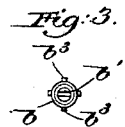
Fig. 3.
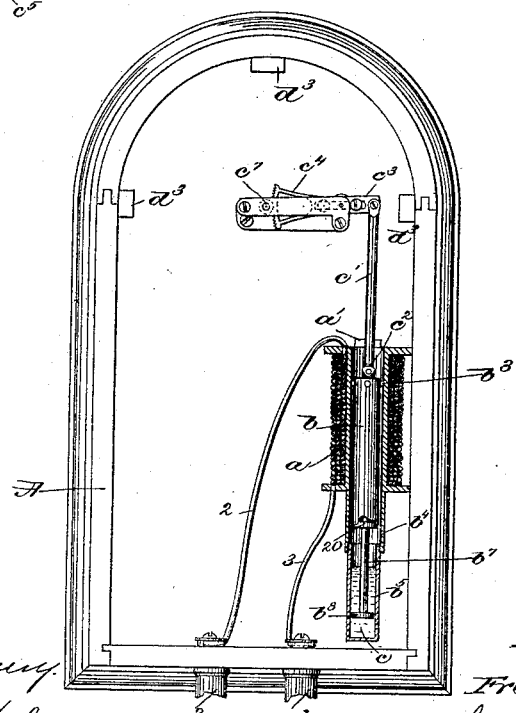
Witnesses
Fred L. Emery.
John F. C. Brinkler
Inventor
Frederic A. Swan
by Crosby & Gregory
attys.

UNITED STATES PATENT OFFICE.

FREDERIC A. SWAN, OF EVERETT, MASSACHUSETTS.

ELECTRIC-CURRENT INDICATOR.

SPECIFICATION forming part of Letters Patent No. 342,475, dated May 25, 1886.

Application filed January 2, 1886. Serial No. 187,399. (No model.)

*To all whom it may concern:*

Be it known that I, FREDERIC A. SWAN, of Everett, county of Middlesex, and State of Massachusetts, have invented an Improvement in Electric Indicators, of which the following description, in connection with the accompanying drawings, is a specification, like letters on the drawings representing like parts.

This invention relates to electric indicators adapted to be used in electric-light systems, to indicate the strength of current in the circuit in which the indicator is placed, and it is especially adapted to be used in connection with the usual "dial" or "wall" controller, commonly used in systems of electric lighting.

In electric-light systems as now used, each circuit, containing a variable number of lamps, is provided with a dial or wall controller, which governs the current in the circuit in which the said dial or wall-controller is placed. The working condition of the different circuits extended from a central or current-generating station is now judged by observing the condition of one lamp of each circuit, such lamp being located within said central station, and also by means of the length of the sparks at the brushes bearing on the commutator.

The means described by which the condition of each circuit is judged are not sufficiently sensitive to indicate small variations in the strength of the current flowing through said circuits.

The object of this invention is to provide electric-light systems with an indicator which shall be sensitive to slight variations in current-strength; and my invention consists, essentially, of a case, a dial, a pointer, and mechanism, as will be described, to move said pointer, combined with a solenoid having its core connected to said mechanism, the movement of said core within said solenoid being transmitted to said pointer through said mechanism, to indicate current changes in the circuit in which the indicator is placed.

My invention also consists in details of construction, to be hereinafter described, and pointed out in the claims at the end of this specification.

Figure 1 is a front view of my improved indicator with the cover of the case removed; Fig. 2, a partial elevation and section with the dial and pointer removed, the core being broken out to show the plug 20; and Figs. 3 and 4, details to be referred to.

The inclosing-case A, of wood or other non-conducting material, and of suitable size to contain the working parts of the apparatus, is designed to be attached to the wall of the dynamo-room, where it can be plainly seen by the attendant in charge. The case A contains within it a solenoid, $a$, held in place by suitable supports, $a'$, only one of which is shown, said supports being attached in suitable manner to said case and secured to said solenoid, one at each end. The wire of the solenoid $a$ has its opposite ends, 2 3, connected to binding-posts $a^2$ $a^3$, to which the line-wires are attached, to place the indicator in circuit. The solenoid $a$ has an iron core, $b$, preferably hollow at its center, and provided at its opposite ends with plugs $b'$ and 20. (See Figs. 2 and 3.) The plug $b'$ of the core, at its upper end, is herein shown as provided with upwardly-projecting ears, which receive between them one end of a link, $c'$, said link and ears being connected together by a pin, $c^2$, inserted through them, said construction facilitating the removal of the core from the solenoid, and at the same permitting the mechanism for moving the pointer to have a wide range of movement. The link $c'$ at its other end is connected to one end of an adjusting-bar, $c^3$, adapted to slide on a rack-segment, $c^4$, fast on a shaft, $c^5$, (see Fig. 4,) said shaft having bearings in a top and bottom plate of a frame-work, said rack-segment engaging a pinion, $c^6$, on a shaft, $c^7$, to which a pointer, $d$, is secured, said pointer moving over a dial, $d^2$, secured to supporting-blocks $d^3$, attached to the frame or case A, said dial having suitable marks on its face, by which to indicate variations in either direction from the normal, at which it is desired the lamps should be maintained.

The described mechanism by which the pointer $d$ is moved may be of any suitable or well-known construction, and is herein shown as the well-known steam-gage movement. The solenoid has a tube-like extension, $b^4$ $b^5$, closed at its lower end, which receives the head $b^8$, forming part of a rod, $b^7$, attached to the plug 20 in the lower end of the core $b$ of the solenoid, the said tube-like extension and head constituting a dash-pot, the tube-like extension containing glycerine or other medium capable of acting as a cushion or check—such as commonly used in dash-pots.

The core $b$ is herein shown as provided at its upper end with lugs $b^3$, preferably of brass, which bear against the walls of the hollow cylinder of the solenoid $a$, as shown in Fig. 2, and act as guides for said core, thus preventing the said core from being attracted laterally, which lateral attraction would render the indicator insensitive to slight variations in the strength of the current flowing through the solenoid. The movement of the core $b$ within the solenoid is steadied by the dash-pot, which also acts as a guide for the lower end of the core $b$, to prevent lateral attraction at that end, thus obviating the employment of fenders $b^3$ at said end.

In the operation of my improved indicator the solenoid $a$ will be so wound as to have the pointer $d$ at zero when a current of normal strength is passing through the circuit, the current being normal when each lamp is burning with proper brilliancy and no defects exist in the line or circuit. When for any reason—such as by the cutting out of a single lamp—the strength of the current flowing through the circuit is increased, the solenoid $a$ attracts its core, lifting it up within it, which upward movement causes the rack-segment to move the pointer $d$ to the right, viewing Fig. 1. If the pointer $d$ remains in a fixed position at the right for any length of time, the attendant is made aware of a fault in the circuit. When the strength of the current is decreased or diminished—such as by placing in circuit one or more lamps, or from resistances foreign to the circuit—the current passing through the solenoid $a$ is weakened, thereby permitting the core $b$ to descend by gravity, thus moving the pointer toward the left, the movement of the pointer toward the left being somewhat retarded by the glycerine in the tube $b^5$. The dash-pot referred to prevents the pointer from being moved too rapidly by sudden fluctuations or changes of current.

It is evident that the cylinder of the solenoid might have ribs of brass extended through it, to serve as fenders against lateral attraction, and thus do away with the fenders $b^3$ on the core; but I prefer the construction shown.

My invention is equally applicable to be used with incandescent light systems, the resistance of the solenoid being increased by suitable winding.

I do not desire to limit myself to the mechanism shown for transmitting the movement of the core to the pointer, as many forms may be used with equally good results.

I claim—

1. In an electric indicator, a case, a dial, a pointer, and mechanism, substantially as described, to transmit motion to said pointer, combined with a solenoid, its core connected to said mechanism, and with guides to prevent lateral attraction of said core, as and for the purpose set forth.

2. In an electric indicator, a case, a dial, a pointer, and mechanism, substantially as described, to transmit motion to said pointer, combined with a solenoid, its core connected to said mechanism and provided with a guide or guides, to prevent lateral attraction, and with a dash-pot to retard, and thereby steady, the movement of the core within said solenoid, as and for the purpose specified.

3. In an electric indicator, a case, a dial, a pointer, and mechanism, substantially as described, to transmit motion to said pointer, combined with a solenoid having its core connected to said mechanism, the movement of said core within said solenoid being transmitted to said pointer, and with the dash-pot to steady the movement of said core, as and for the purpose specified.

In testimony whereof I have signed my name to this specification in the presence of two subscribing witnesses.

FREDERIC A. SWAN.

Witnesses:
J. H. CHURCHILL,
G. W. GREGORY.